Sept. 14, 1948.  C. W. CHILLSON  2,449,452
PROPELLER GOVERNOR
Filed March 15, 1939  4 Sheets-Sheet 1
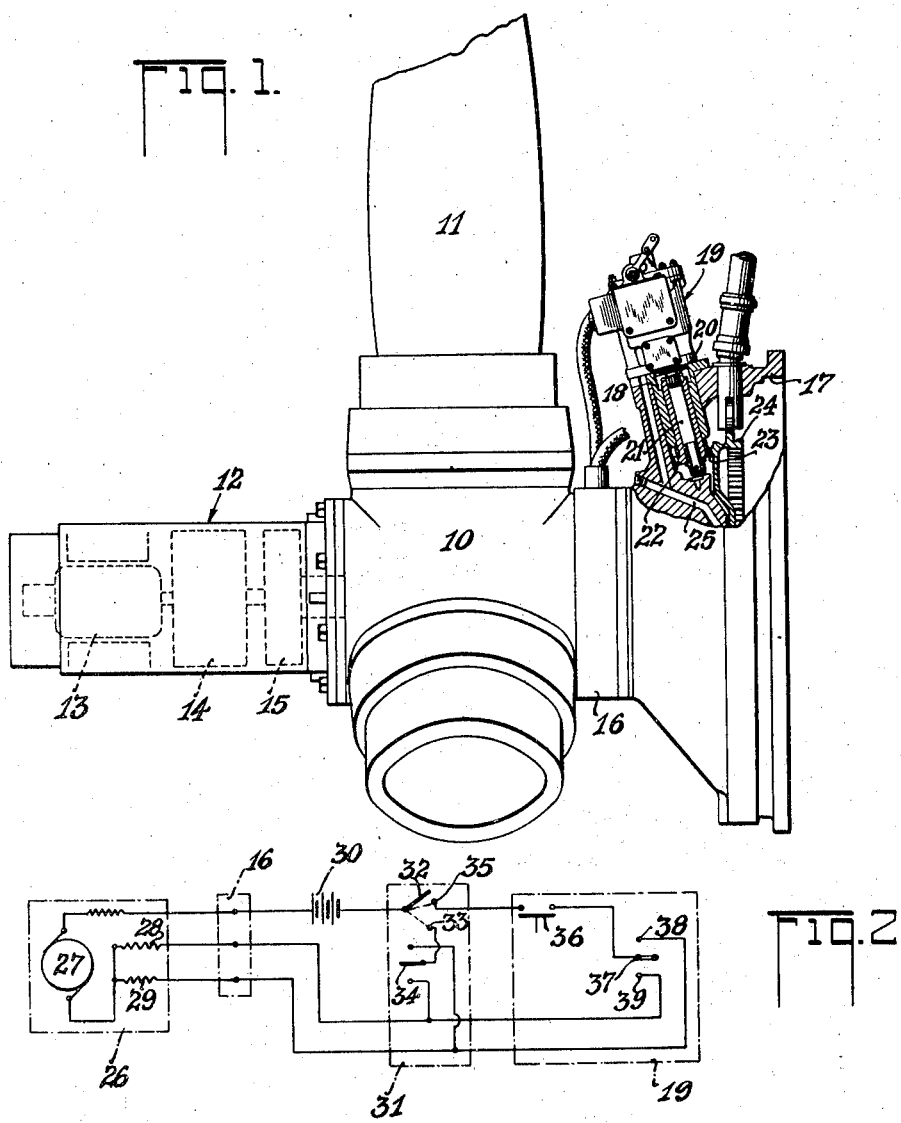
INVENTOR
CHARLES W. CHILLSON
BY
ATTORNEY Sept. 14, 1948. C. W. CHILLSON 2,449,452
PROPELLER GOVERNOR
Filed March 15, 1939 4 Sheets-Sheet 2
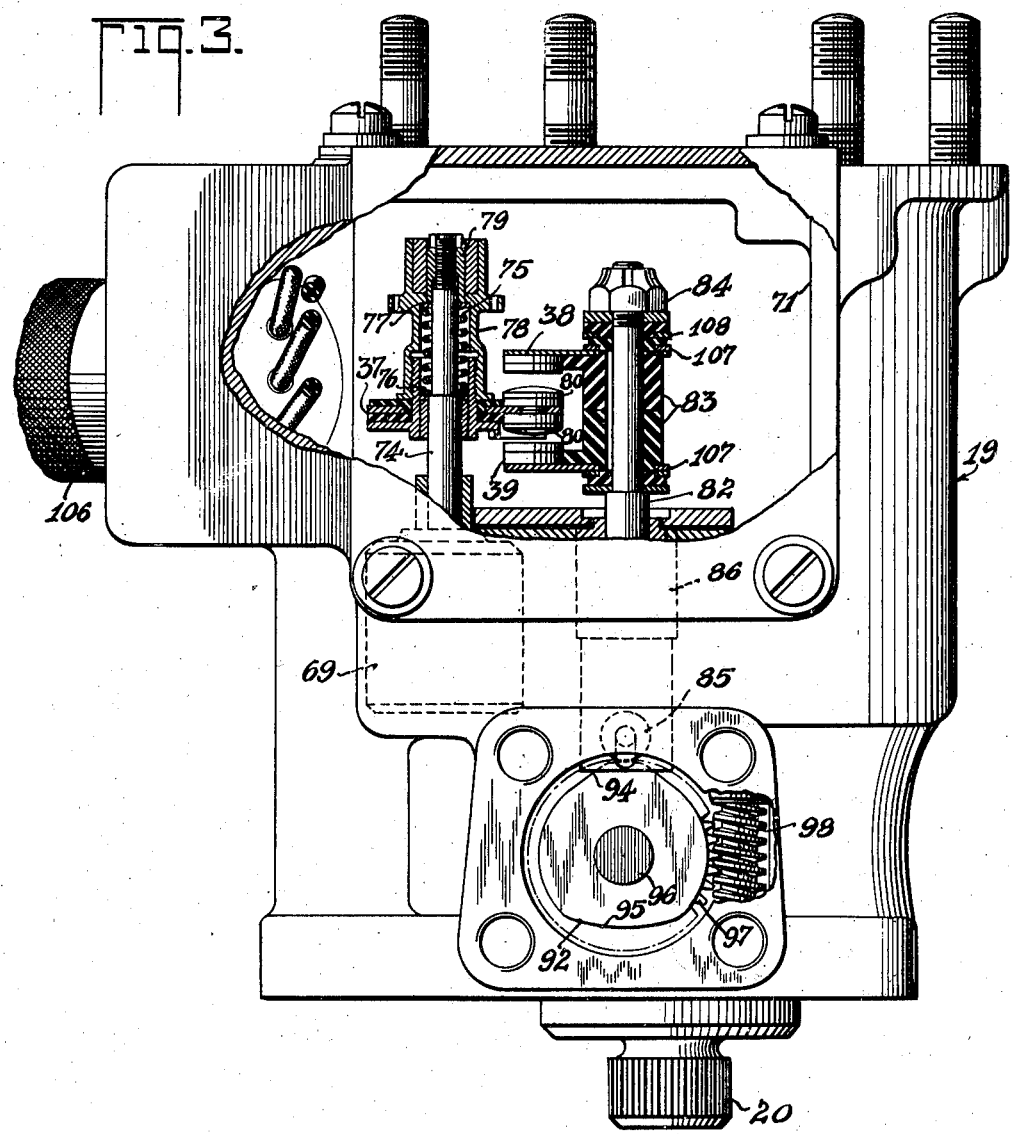
INVENTOR
CHARLES W. CHILLSON
BY
ATTORNEY

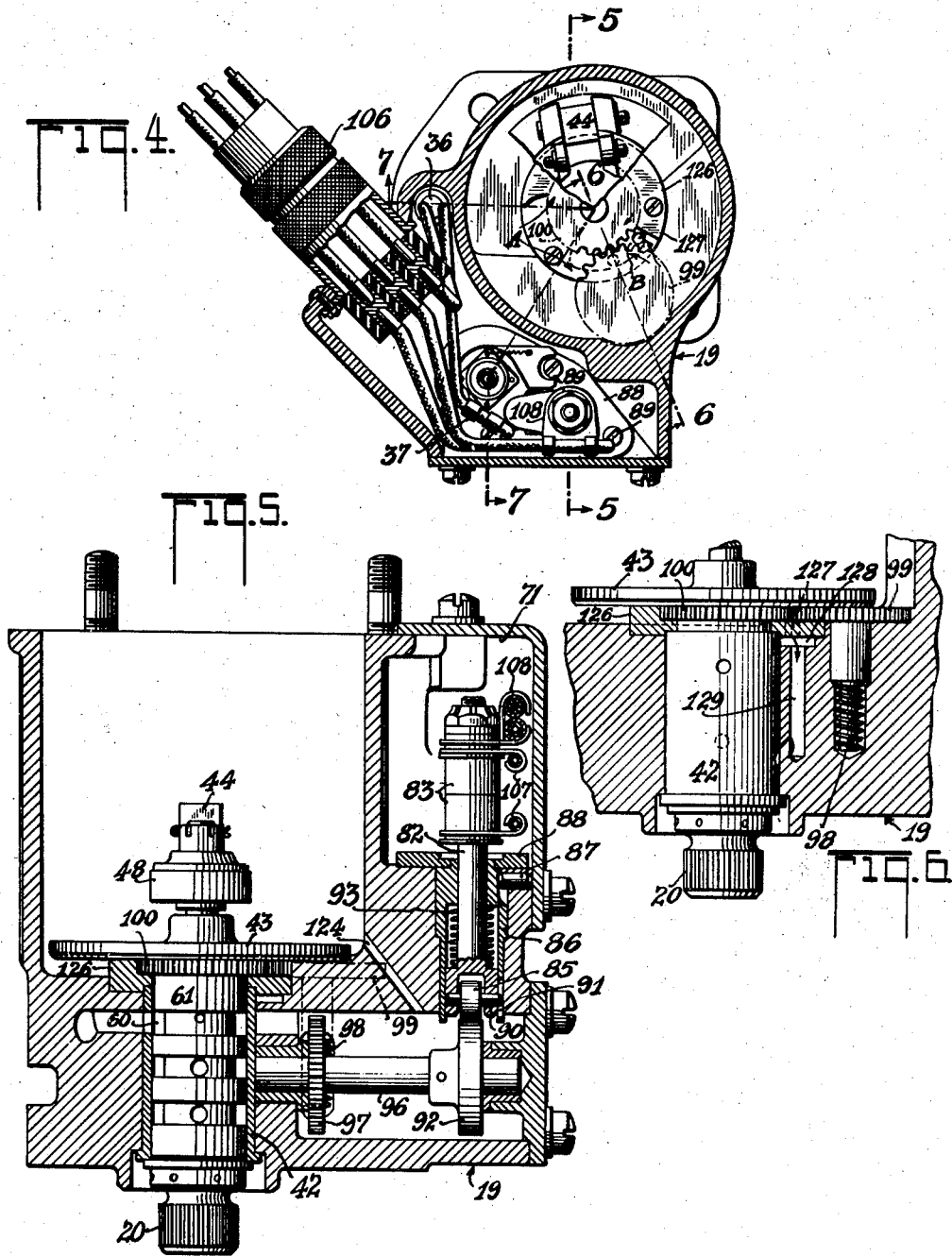

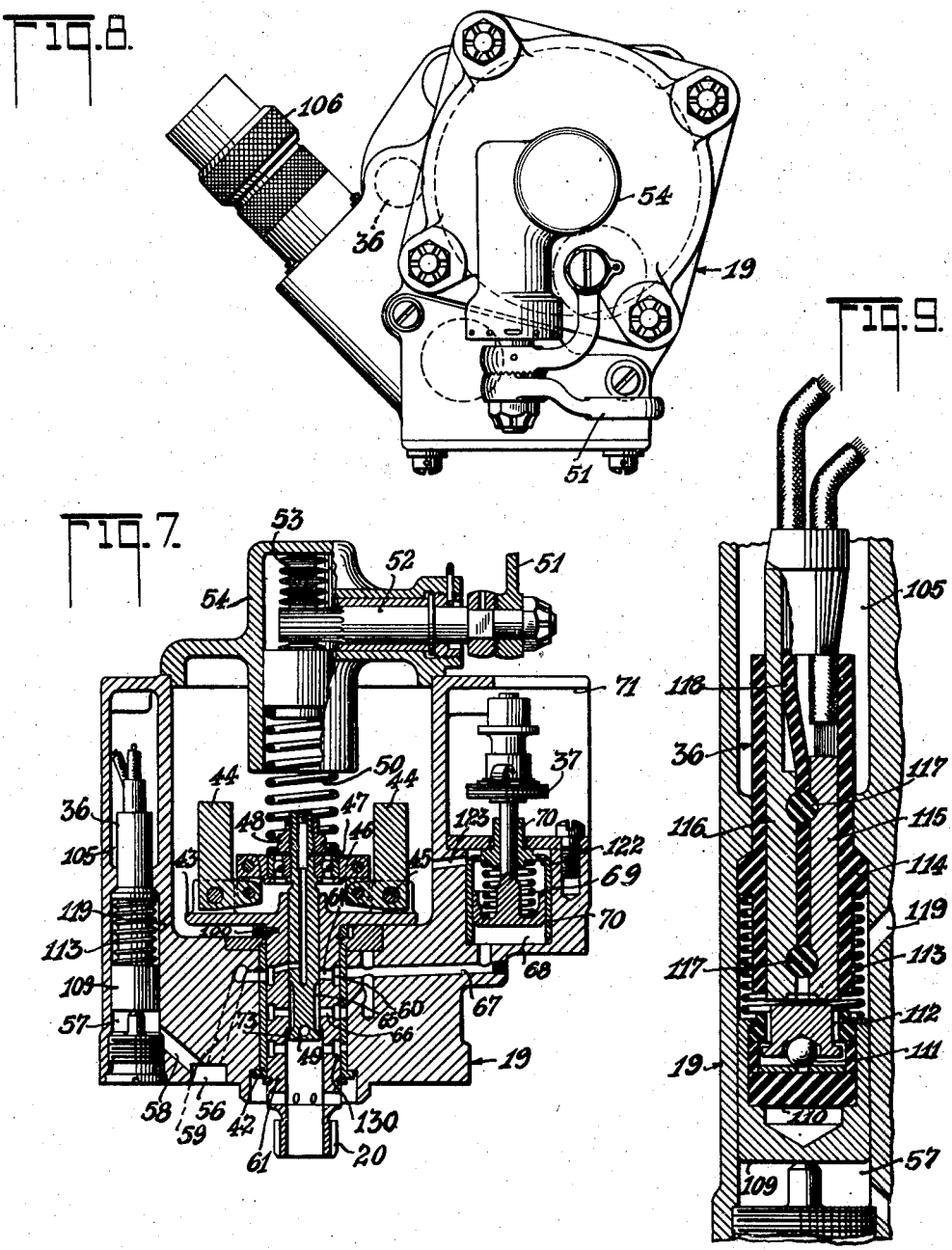

Patented Sept. 14, 1948

2,449,452

UNITED STATES PATENT OFFICE 2,449,452

PROPELLER GOVERNOR

Charles W. Chillson, Clifton, N. J., assignor to Curtiss-Wright Corporation, a corporation of Delaware Application March 15, 1939, Serial No. 261,879

13 Claims. (Cl. 170—163)

This invention relates to control and governing mechanisms for controllable pitch aircraft propellers, the particular embodiment of the invention chosen for illustration being applicable to electrically operated controllable pitch propellers of the type disclosed in Patent No. 1,951,320, issued March 13, 1934, to W. J. Blanchard.

Controllable pitch propellers are now being provided with a governor by which pitch settings of the propeller are increased or decreased in response to tendencies of the engine to gain or lose R. P. M. from a pre-set standard, whereby the propeller maintains constant speed at any desired setting of the governor.

An inherent characteristic of a speed regulating system such as the constant speed governor, controllable - pitch - propeller, airplane - engine combination where the rate of pitch change is essentially constant regardless of the magnitude of the pitch correction being made, and where there is an appreciable time lag between the application of the correction and the responses of the propeller due to engine and propeller inertia, is that for a given substantially constant rate of correction and a definite time lag relationship, there will be a definite maximum governor sensitivity which the system will tolerate without developing hunting characteristics.

With the growing need for rapid pitch change to prevent over and under speeding with rapid throttle changes or abrupt changes in flight regime, combined with the importance of synchronizing engines closely on multi-motor installations, it has become desirable to provide some means for speed control other than a simple single sensitivity governor. For this reason, a "proportional" type of control has been developed which supplies pitch corrections in response to speed variations in increments, the magnitude of which are proportional to the speed variation. This not only provides a closer speed control but permits the use of a higher basic rate of pitch change without causing hunting.

An object of this invention is to provide a governing mechanism for a controllable pitch propeller which shall produce pitch change impulses of varying dwell according to the pitch deviation from the desideratum, the impulses shortening as the pitch approaches the desired value.

A further object is to provide such a governor arrangement particularly applicable to propellers whose pitch is controlled electrically.

Another object of the invention is to provide a governor mechanism whose control action may be transmitted intermittently to the propeller control motor, the dwell of the intermittent pitch changing impulses decreasing as the propeller approaches the desired pitch setting.

Still another object is to provide a governing mechanism which will operate automatically to effect either increase or decrease in propeller blade pitch.

Additional objects comprise the use of a hydraulically controlled electric governor unit and the provision of a hydraulic pressure responsive switch controlling propeller response to the governor, whereby failure of hydraulic pressure will lock the propeller in fixed pitch in or at normal operating range.

Further objects of the invention comprise the particular construction of a governor mechanism, the features of which will be pointed out in the annexed detail description in connection with the drawings, in which:

Fig. 1 is an elevation of a part of a controllable pitch propeller as mounted upon an engine nose, the latter being partly in section to show the propeller governor drive;

Fig. 2 is a wiring diagram of the electrical circuit involved in the system;

Fig. 3 is an enlarged elevation of the propeller governor in the same aspect as is shown in Fig. 1, partly broken away and partly in section, to show certain of the details of construction;

Fig. 4 is a plan section, broken away in part, of the governor;

Figs. 5, 6 and 7 are sections, respectively, on the lines 5—5, 6—6 and 7—7 of Fig. 4;

Fig. 8 is a plan of the governor, and

Fig. 9 is an enlarged detail section through a portion of the governor mechanism.

Reference may first be made to Fig. 1, in which 10 designates a propeller hub carrying blades 11 mounted for pitch changing rotation and carrying a power unit 12, the latter comprising an electric motor 13 and speed reducers 14 and 15 connected by gears, not shown, to the blade roots. The elements 10 to 15, inclusive, along with a slip ring assembly 16, are generally similar to the propeller mechanism shown in said Patent No. 1,951,320. The propeller is mounted upon an engine propeller shaft carried in part by an engine nose section 17 which incorporates a mounting pad 18 for a governor shown in its entirety as 19. This governor has a driving connection 20 with a shaft 21 driven through an integral bevel gear 22 from a bevel gear 23 carried on a rotating part 24 of the engine which, as shown, comprises a part of the cam and valve gear system. The engine pressure oiling system provides part of the operating power for the governor in a manner hereafter to be described, pressure oil being led through a conduit 25 in the nose section to the governor mounting pad 18.

Fig. 2 shows the wiring system for the propeller, the dot-dash line block 26 representing the propeller power unit embodying the motor rotor 27, and pitch increasing and pitch decreasing field windings 28 and 29, respectively. The block 16 represents the slip ring assembly. A power source 30 is provided; and blocks 31 and 19 represent a manual control unit and the automatic control unit. Connections from the manual control unit 31 to the propeller are conventional in character, the control unit having a master switch 22 contactible with a switch point 33 to place the circuit in readiness for selective pitch increase or decrease through the switch 34. The switch 32 may also be engaged with the point 35 which disconnects the manual selective control and places the governor unit 19 in circuit, this circuit including a switch 36 responsive, as will be described hereafter, to oil pressure and consequently to engine operation. The unit also includes an oscillatable switch arm 37 contactible with switch points 38 and 39 to decrease or increase propeller pitch respectively, the switch unit 37—38—39 being governor controlled, as will become apparent.

Reference may now be made to Figs. 3 to 9, which show the details of construction of the governor 19. Referring particularly to Fig. 7, it will be seen that the governor driving connection 20 comprises a sleeve rotatable in a bushing 42, the sleeve terminating in a governor plate 43 on which flyweights 44 are pivoted at 45, the flyweights being connected to a ring 46 secured to the outer race of a ball thrust bearing 47, the inner race of which is secured by the nut 48 to a valve stem 49. The vertical position of the valve stem is accordingly controlled by the position of the flyweights 44 which, of course, makes the vertical position of the valve stem speed responsive. A spring 50 counteracts radial displacement due to centrifugal force in the flyweights 44 and the force imposed by the spring upon the governor is adjustable by turning a lever 51 mounted on a shaft 52 having an integral pinion meshing with a rack 53 which forms the top abutment for the spring 50. This adjustment is mounted in a housing 54 which forms a cover for the governor.

The pressure oil conduit 25 previously referred to terminates adjacent the mounting pad on the engine and registers with a segmental groove 56 (Fig. 7) at the mounting face of the governor, drillings leading therefrom to a safety switch cavity 57 through a drilling 58. Another drilling 59 leads from the groove 56 to the upper part of the bushing 42 through a hole in which the oil may pass to an annulus 60 formed in the sleeve 61 driven by the element 20. This sleeve has a drilling 64 through which oil may pass to an annular groove 65 in the valve stem 49 when the latter is raised by the governor flyweights. Oil may flow through the annular groove to lower radial drillings 66 in the sleeve 61 which communicate with a set of passages 67 leading to a cylinder 68 having therein a spring-pressed piston 69, the stem of which is borne in a bushing 70 and extends into a switch box 71 to carry the switch arm 37 indicated in the wiring diagram and shown more clearly in Fig. 3. When the valve stem 49 assumes a low position due to low engine R. P. M., the opening 64 is covered and the annular groove 65 of the valve stem may uncover the bore of the sleeve 61, as at 73, to permit oil to bleed from the cylinder 68 to the engine crankcase. The stem and sleeve units 49 and 61 thereby comprise a governor controlled hydraulic valve which will control the position of the switch arm piston 69 in accordance with engine R. P. M. as selected by adjustment of the governor spring control arm 51. Any variations in engine speed will find response in the position of the valve stem 49 and thus in the position of the piston 69.

Referring now to Fig. 3, it will be seen that the stem of the piston 69, designated 74, is embraced by a spring 75 abutting at its ends upon slidable washers 76 and 77 abutting shoulders on a sleeve assembly 78, the washer 76 also abutting a lower shoulder on the stem 74 and the washer 77 abutting a cylindrical nut 79 screwed upon the stem 74 with respect to which the sleeve assembly 78 is slidable. By this construction, the spring 75 holds the sleeve 78 in a normally fixed position, but if the sleeve be positively reciprocated with respect to the valve stem 74, the spring provides a resilient centralizing force regardless of the direction of displacement of the sleeve. The sleeve 78, as is apparent, carries the switch arm 37 in insulated relation thereto, the arm being provided with appropriate contact pieces 80.

Mounted in the housing and projecting into the box 71 is a reciprocable plunger 82, as shown in Figs. 3 and 5, this plunger carrying the contacts 38 and 39 in insulated relation thereto and and to each other through bushings 83 secured by a nut 84. The contact pieces 38 and 39 are engageable in a manner later to be described with the contacts 80. The plunger 82 carries, at its lower end, a roller 85, the plunger being reciprocable in a bushing 86 secured from rotation by a dowel 87 and anchored to the deck of the box 71 by a plate 88 and screws 89 (Fig. 4). The plunger is prevented from rotating in the bushing 86 by the engagement of the roller pin 90 in a slot 91 in the bushing. The roller 85 engages a cam 92, being spring-pressed toward the cam by a spring 83 within the bushing. Said cam is provided with a projecting lobe 94 and a depressed lobe 95, and is carried upon a shaft 96 journaled in the housing and having a worm wheel 97 driven by a worm 98 on the upper end of the shaft of which a pump gear 99 (Figs. 4, 5 and 6) is secured. The gear 99 meshes with a gear 100 secured to the engine driven sleeve 61, the gears 99 and 100 comprising a scavenging oil pump, the nature of which will be described shortly. It will be apparent, however, that the camshaft 96 with its cam is driven by the sleeve 61 so that the plunger 82 is reciprocated up and down in proportion to engine speed. The dwell of the cam follower on the concentric portions of the cam holds the contact pieces 38 and 39 in neutral position, whereas, when the cam follower rises on the lobe 94 and drops into the lobe 95, successive downward and upward movements are imparted to the contact carrying bushings 83. The general operation of the system will now become apparent—certain detailed structures have not yet been fully covered, but are accessory to the governor assembly, and will be pointed out hereafter.

Since the propeller pitch actuating motor 13 runs at constant speed when energized, it would tend to produce a constant rate of pitch change in the propeller regardless of the amount of pitch change that may be necessary. The intermittent action of the governor has the effect of producing continuous energization of the propeller pitch motor when the pitch change to be made is large, but has the effect of intermittently energizing the motor when the pitch change to be made is small. The accomplishment of this function will be apparent when it is realized that the position of the contact points 80 is always determined in response to engine R. P. M. and to the setting of the lever 51. When the propeller pitch is at such a setting that propeller load is proper for a certain engine speed and power output, the contacts 80 will be centralized between the contacts 38 and 39 which, despite their continual reciprocation will not engage the contacts 80. So soon as the propeller R. P. M. departs from that established by a proper balance of the governor, the governor will change position and will either raise or lower the contacts 80, whereupon one or the other of the reciprocating contacts 38 or 39 will intermittently engage contact 80 to intermittently energize the propeller pitch motor, to operate same for the purpose of altering the propeller pitch to re-establish the R. P. M. balance. If the deviation from normal is pronounced, one of the contacts 80 may ride the contacts 38 or 39 throughout an entire reciprocative movement, the spring 75 associated with the carrier of the contacts 80 permitting of this continual contact. As propeller pitch approaches the desired pitch, the position of the contacts 80 will have been raised or lowered to shorten the contact time during reciprocations of the contacts 38 and 39 until finally, said contacts cease and the system again becomes balanced.

In Figs. 7 and 9 is shown the safety switch 36 which comprises a switch assembly inserted into a bore 105 in the governor housing, the two wires from the safety switch leading respectively through arm 37 to contacts 80 and to a junction plug 106. This junction plug 106 also carries two additional wires leading to the contacts 38 and 39, being clipped to the bushings 83 by clips 107 and 108. As shown in Figs. 7 and 9 the bottom part of the bore 105 terminates in the cavity 57 communicating with the oil pressure source, the switch comprising a piston 109 acted upon by pressure oil to raise same. The piston 109 carries an insulating bushing 110 within which a ball 111 rests, the ball carrying a contact yoke 112 raisable with the piston. This piston is normally urged downwardly by a spring 113 enclosing an insulating sleeve 114 which in turn embraces contact bars 115 and 116 axially located in the bushing 114 by insulating pins 117, the bars being insulated from one another by a strip 118. The lower ends of the bars 115 and 116 are bridged by the element 112 so that when sufficient oil pressure exists below the piston 109 the switch circuit is closed. When such pressure is relieved, the element 112 breaks the circuit of the switch. Oil relief from the switch is provided through a drilling 119 by which leakage may flow to the governor cavity for subsequent drainage to the engine. The safety switch is preferably set to open the governor circuit when oil pressure drops below 15 to 20 lb. per sq. in. whereupon the propeller will assume a fixed pitch subject to change by the manual unit 31.

In connection with the piston 69 and associated structure, said piston slides in the bushing 70 part of which is formed as a cylinder which is provided with holes 122 to receive oil leaking past the piston and from which oil may flow through a drilling 123 in the housing, shown in Fig. 7, to the governor cavity. In Fig. 5 passage 124 supplies lubricating oil to cam 92, gears 97 and 98 and associated journal bearings from surplus oil in the governor cavity. It also provides a pressure relief for the oil filled cam cavity against pressure fluctuations caused by the reciprocation of plunger 82.

Below the governor plate 43 referring to Figs. 4 and 6, the gears 99 and 100 are located, and the floor of the governor cavity is so formed in conjunction with a ring 126 as to provide a housing embracing the gears 99 and 100 to permit them to operate as a scavenging oil pump. Oil collecting in the governor cavity will enter the gear teeth, as shown by the arrows A, and will be carried around the gears to the point B, whereat a hole 127 is drilled in the ring 126 to permit scavenge oil to flow into a cavity 128 connecting with a drilling 129 in the housing which in turn discharges through a hole in the bushing 42 as at 130 whence the oil may pass through the hollow driving sleeve to the interior of the engine crankcase.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a governor system for an aircraft power plant including an engine and a controllable pitch propeller driven thereby, electric motor means for changing the propeller pitch, a reciprocable switch member driven by the power plant, a second switch member engageable with the first, means to control the position of said second member in proportion to engine speed, said members being thereby contactable for longer or shorter dwell upon reciprocation of the first member according to the speed responsive position of said second member, and control connections from said switch members to said electric motor.

2. In a governor system for an aircraft power plant, a controllable pitch propeller, power means for changing the propeller pitch, a first member reciprocably driven by the engine, a second member intermittently engageable with the first due to reciprocation thereof, having engine speed responsive means associated therewith for positioning same according to engine speed, the engagement dwell of said members being variable according to the position of said second member, and means responsive to engagement of said members for energizing said pitch changing power means.

3. In a governor for an engine having a fluid pressure supply and a rotating shaft, a valve sleeve rotated by the shaft, a flyweight governor on the sleeve having a valve stem movable axially in the sleeve upon change in the flyweight position due to R. P. M. changes, a conduit conducting pressure fluid to said sleeve, a cylinder-piston assembly connected to said sleeve to receive or discharge fluid according to the valve position in said sleeve, a switch arm carried by one element of the piston-cylinder assembly, a second switch arm intermittently movable toward and away from said first arm, means driven by the engine to effect said intermittent motion, and means actuated by contacts of said arms for altering the speed of said engine.

4. In a governor for an engine having a fluid pressure supply and a rotating shaft, a valve sleeve rotated by the shaft, a flyweight governor on the sleeve having a valve stem movable axially in the sleeve upon change in the flyweight position due to R. P. M. changes, a conduit conducting pressure fluid to said sleeve, a cylinder-piston assembly connected to said sleeve to receive or discharge fluid according to the valve position in said sleeve, a contact carrier on one element of the piston-cylinder assembly, a cam driven from said sleeve, a plunger reciprocated by said cam, a second contact carrier on said plunger, a switch point on one said carrier, slow and fast switch points on the other said carrier, said first switch point being contactable with one or the other of said slow and fast switch points according to the governor controlled relation of said piston-cylinder assembly, and means energized by said contacts operable to increase or decrease engine speed.

5. In a speed control system for an aircraft engine driving a controllable pitch propeller, with pitch changing means therefor, the combination of an engine driven governor, a switch arm positioned in response to governor operation, a second switch arm, one of said switch arms being resiliently mounted, and means for cyclically moving one of said switch arms toward and away from contact with said other switch arm for intermittently energizing said pitch changing means upon a speed variation, whereby the duration of said energizing periods is proportional to the speed variation.

6. In a control system for an aircraft power plant, a controllable pitch propeller driven thereby, electrical means to alter the pitch setting of the propeller, fluid pressure means responsive to changes in the speed of the engine from a preset standard to control the electrical means, and means responsive to the magnitude of the speed deviation from said standard for continuously altering, during the period in which the speed of the propeller is different from that desired, the amount of electric energy per average unit of time conducted to said electrical means, thus to vary the average rate of pitch change of the propeller.

7. In a speed control system for an aircraft engine driving a controllable pitch propeller, power means for changing the propeller pitch, and means responsive to engine speed variation from a desired value to intermittently energize said pitch changing means, the duration of said energizing periods being proportional to the speed variation, said last named means comprising fluid pressure means responsive to engine speed variation, a member movable by said fluid pressure means in proportion to the speed variation, a second member adapted to contact said first member to energize said pitch changing means, and means to cyclically move one of the members relative to the other.

8. In a speed control system for an engine having a pressure lubricating system and a controllable pitch propeller, power means to alter the propeller pitch, a movable switch contact, means responsive to variations in engine speed to control the application of lubricant pressure to position said switch contact in accordance with the engine speed, a second switch contact, means for cyclically moving one of said contacts relative to the other contact for intermittent engagement therewith, upon a speed variation, to intermittently energize said power means.

9. In a governor system for an aircraft power plant including an engine, a controllable pitch propeller driven thereby, electrically controlled motor means for changing the propeller pitch, a cyclically back-and-forth movable switch member driven by the power plant, a second switch member engageable with the first, means to control the position of said second switch member in its position as a function of engine speed, one of said switch members being yieldably mounted to allow of contact dwell of said switch members upon overtravel thereof, said members being thereby contactable for longer or shorter dwell upon back-and-forth movement of said first member according to the speed responsive position of said second member, and control connections from said switch members to said electrically controlled motor means.

10. In a governor system for an aircraft power plant, a controllable pitch propeller, power means for changing propeller pitch, a first member driven by the engine for back-and-forth movement, a second member intermittently engageable with the first due to said movement, engine speed responsive means associated with said second member for positioning same according to engine speed, one of said members being yieldably mounted to allow of engagement dwell of said members upon overtravel thereof, the engagement dwell of said members being variable according to the position of said second member, and means responsive to engagement of said members for energizing said pitch changing means.

11. In a governor system for an aircraft power plant, a controllable pitch propeller driven thereby, power means for changing the pitch of said propeller, at least two switch contact carrying devices intermittently movable toward and away from one another, the contacts carried by said devices being intermittently engageable, means to move one said device cyclically toward and from the other device, means to position one said device in a plurality of positions each position corresponding to a certain engine speed, the mounting of one contact on one said device including a yieldable element to allow continued engagement of said contacts upon overtravel of said devices relative to each other, and means responsive to engagement of said contacts for energizing said pitch changing means.

12. In a governor system for an engine having a fluid pressure supply and a rotating shaft, a valve sleeve rotated by said shaft, a flyweight governor on the sleeve having a valve stem movable axially in the sleeve upon change in the flyweight position due to R. P. M. changes, a conduit conducting pressure fluid to said sleeve, a cylinder-piston assembly connected to said sleeve to receive or discharge fluid according to the valve position in said sleeve, a switch member carried by one element of the piston-cylinder assembly, a second switch member movable toward and away from said first member for intermittent contact therewith, one of said members being yieldably mounted to allow of engagement dwell of said members upon overtravel thereof, means driven by said engine to effect such intermittent movement, and means actuated by member contacts for altering the speed of said engine.

13. In a speed control system for an aircraft engine driving a controllable pitch propeller having means to change propeller pitch, the combination of an engine driven governor presettable to a desired engine speed, a switch arm positioned in response to governor operation, a second switch arm, one of said switch arms being resiliently mounted, and means for cyclically moving one of said switch arms toward and at times into contact and away from and out of contact with said other switch arm to produce intermittent and variable contact dwells, upon speed deviations of said engine from the desired speed said propeller pitch changing means being responsive in its energization operation to contacts of said arms, whereby the duration of energizing periods due to contact dwells is proportional to the speed deviation of said engine.

CHARLES W. CHILLSON.

REFERENCES CITED

The following references are of record in the file of this patent:

UNITED STATES PATENTS

| Number | Name | Date |
|---|---|---|
| 583,326 | Cary | May 25, 1897 |
| 661,222 | Mershon | Nov. 6, 1900 |
| 749,476 | Curtis | Jan. 12, 1904 |
| 844,129 | Hill et al. | Feb. 12, 1907 |
| 1,284,484 | Smith | Nov. 12, 1918 |
| 1,374,787 | Walker | Apr. 12, 1921 |
| 1,485,865 | Meyer | Mar. 4, 1924 |
| 1,515,227 | Staege | Nov. 11, 1924 |
| 1,676,902 | Jones et al. | July 10, 1928 |
| 1,713,470 | Fundingsland | May 14, 1929 |
| 1,719,263 | Freay | July 2, 1929 |
| 1,723,617 | Hele Shaw | Aug. 6, 1929 |
| 1,801,366 | Peterson | Apr. 21, 1931 |
| 1,872,133 | Fogwell et al. | Aug. 16, 1932 |
| 1,908,894 | Findley | May 16, 1933 |
| 1,947,602 | Kerr | Feb. 20, 1934 |
| 1,968,029 | Couch | July 31, 1934 |
| 1,975,748 | Holman | Oct. 2, 1934 |
| 2,026,814 | Caldwell | Jan. 7, 1936 |
| 2,060,900 | Simmen | Nov. 17, 1936 |
| 2,076,202 | Lewellen et al. | Apr. 6, 1937 |
| 2,117,891 | Kalin | May 17, 1938 |
| 2,128,983 | Blanchard | Sept. 6, 1938 |
| 2,131,527 | Sousedik | Sept. 27, 1938 |
| 2,204,640 | Woodward | June 18, 1940 |
| 2,205,264 | Kalin | June 18, 1940 |
| 2,205,678 | Adams | June 25, 1940 |
| 2,228,776 | Mullen | Jan. 14, 1941 |
| 2,229,058 | Dicks | Jan. 21, 1941 |

FOREIGN PATENTS

| Number | Country | Date |
|---|---|---|
| 1,539 | Great Britain | Nov. 7, 1912 |
| 388,912 | Great Britain | Mar. 9, 1933 |
| 399,230 | Great Britain | Oct. 5, 1933 |
| 451,520 | Great Britain | Aug. 7, 1936 |
| 671,248 | France | Aug. 31, 1929 |